Patented May 23, 1939

2,159,743

UNITED STATES PATENT OFFICE 2,159,743

CELLULOSIC STRUCTURE AND METHOD FOR PREPARING SAME

George H. Latham and James K. Hunt, Wilmington, Del., assignors, by mesne assignments, to E. I. du Pont de Nemours & Company, Wilmington, Del., a corporation of Delaware No Drawing. Application June 18, 1935, Serial No. 27,232

5 Claims. (Cl. 99—171)

This invention relates to the inhibition of mold growth by means of a wrapping material which is provided with an agent capable of acting as a mold growth inhibitor. More particularly the invention relates to cellulosic wrapping materials, such as pellicles of regenerated cellulose, which have been so treated as to render them inhibitive toward mold growth while at the same time they remain non-toxic toward food-stuffs or the like which may be wrapped therein.

In recent years it has become common practice to wrap various commodities, including food-stuffs such as fruits, breads, meats, and the like, in cellulosic wrapping materials where the latter are non-fibrous, smooth, dense, substantially non-porous, and preferably transparent. In many instances the commodities so wrapped are subject to the development of mold and the wrapping, because of its density and non-porosity, may at times serve to incubate the mold spores and thereby contribute to or at least fail to retard the mold growth. Thus, for example, bread, wrapped in a regenerated cellulose wrapper and stored under conditions conducive to mold growth, may develop mold rather quickly. In the same way, fruit, such as oranges, may develop mold despite the cellulosic wrapper.

Previous attempts have been made to prevent mold growth by treating the wrapping material with fungicides or the like. Such wrappers have, however, been ineffective where the commodity is already inoculated with mold spores, serving only to protect the wrapper itself from developing mold in or on its structure. Similarly the commodities themselves have been treated with fungicides, but this sort of treatment is obviously inapplicable to all commodities, particularly foodstuffs, either because of the nature of the commodity or the toxicity of the fungicide. Furthermore if the wrapper itself is not treated it is receptive to mold spores and their subsequent growth. In the case of transparent wrappers, mold growth on the commodity or the wrapper is not only undesirable insofar as the commodity is concerned but, even though the mold may do no harm, it is repulsive to the consumer and the result is an unsightly, unsalable package. In many instances the treatments of the prior art involve odorous materials which impart odor or taste to the wrapped commodities and obviously this is highly undesirable.

In accordance with the present invention it has been found possible to provide a wrapping material which not only resists the development of mold in or on its structure but at the same time inhibits the growth of mold in or on the commodity which may be wrapped therein, even though the commodity may have been inoculated with mold spores prior to wrapping. The wrapping material provided by this invention is, moreover, non-toxic and the edibility of foodstuffs wrapped therein is in no wise affected. In the event that mold growth should develop within a package wrapped with the material of this invention, either because of the excessive supply of mold spores in or on the commodity, as might be the case with bruised or damaged fruits, it is significant to note that the unbroken wrapper of the present invention will prohibit the passage of mold spores therethrough and consequently adjacent packages will not be contaminated, the mold growth being confined within the package in question.

It is therefore an object of this invention to provide a cellulosic wrapping material capable of inhibiting mold growth either in or on its own structure and/or in or on the structure of articles or commodities wrapped therein.

It is a further object of this invention to provide a non-toxic mold inhibitive cellulosic wrapping material which is smooth, dense, non-fibrous, substantially non-porous and preferably transparent. More specifically it is the object of the invention to provide a mold inhibitive wrapping material comprising a pellicle of regenerated cellulose.

Other objects will be apparent in view of the following disclosure.

The objects of the invention are accomplished by treating the base material which is to serve as the wrapper with a material which is a mold inhibitive agent or which decomposes slowly to yield a mold inhibitive agent. In the practice of the invention sufficient quantity of the agent is employed to accomplish the desired degree of mold inhibition, while at the same time avoiding such excess as will impart odor or taste to the wrapped articles.

As base materials for the wrapper, the invention contemplates cellulosic pellicles which are smooth, dense, non-fibrous, substantially non-porous and preferably transparent, such as may be obtained by coagulation and/or regeneration of aqueous cellulosic dispersions. Such pellicles include those of regenerated cellulose produced by the viscose or cuprammonium processes, glycol cellulose, cellulose glycollic acid, lowly esterified or lowly etherified methyl, ethyl or acetyl cellulose or the like.

As the mold inhibitive agents the invention contemplates the use of formaldehyde, thioformaldehyde or substances which slowly and spontaneously liberate formaldehyde or thioformaldehyde. Included among such substances may be mentioned:

Paraformaldehyde
Monomethylolurea
Dimethylolurea
Di(diethylaminomethoxymethyl)urea
Acetone-formaldehyde
Formaldehyde-starch complex
Monoethanolamine formaldehyde condensates
Diethanolamine-formaldehyde condensates
Dipropanolamine-formaldehyde condensates
Secondary amine-formaldehyde condensates
Chloro-methyl ether.

Similarly the thioformaldehyde analogues may be used or other formaldehyde or thioformaldehyde liberating materials. The mold inhibitive agents may be used singly, or two or more of them may be used in combination with each other.

It has been found most convenient to apply the agents from solutions containing a concentration of the mold inhibitive agent ranging from 0.5 to 20% although most satisfactory results are usually obtained through the use of concentrations ranging from 1–5%. Obviously the concentration of solution will be chosen according to the potency of the agent and the type of wrapping material finally desired.

It is usually desirable to incorporate a softener or flexibilizing agent, such as glycerol, glycol, diethylene glycol or the like, in the cellulosic pellicle. This can be incorporated conveniently by adding the softening agent to an aqueous bath solution containing the mold inhibitive agent. Obviously the pellicle will be treated after the pellicle has been coagulated or regenerated, purified and washed thoroughly and just before it passes to the drying apparatus, for otherwise either or both the softening and mold inhibitive agents would be washed out or diluted.

Although it is usually preferable to apply the mold inhibitive agent by immersion of the pellicle in an aqueous bath, it is nevertheless equally efficacious to apply the same from any desirable solvent solution by immersion, brushing, spraying or other known method of application.

The invention will be more clearly illustrated by reference to the following specific examples, it being understood that the scope of the invention is in no way limited thereto.

Example I

A sheet of plain regenerated cellulose sheeting, softened or not as desired, is immersed in the following composition which is maintained at a temperature of about 35° C.

| | Parts by weight |
|---|---|
| Water | 89.0 |
| Gelatin | 5.0 |
| Glycerol | 5.0 |
| Formaldehyde | 1.0 |

After removal from the solution, the sheet is allowed to drain or is passed between squeeze rolls whereupon it is hung vertically and allowed to dry in air at a temperature of about 25–30° C. The dry pellicle is useful as a mold inhibitive wrapping material.

Example II

A sheet of plain regenerated cellulose sheeting, softened or not as desired, is immersed in a bath of the following composition which is conveniently maintained at room temperature or lower:

| | Parts by weight |
|---|---|
| Water | 94.0 |
| Glycerol | 5.0 |
| Formaldehyde | 1.0 |

After removal from the bath, the drained sheet is allowed to dry while hung vertically in air at room temperature.

Example III

A sheet of plain regenerated cellulose sheeting is treated as in Example II except for the use of the following bath composition:

| | Parts by weight |
|---|---|
| Water | 90.0 |
| Formaldehyde | 5.0 |
| Glycerol | 5.0 |

Where it is not important to soften the pellicle the following example will illustrate the treatment.

Example IV

A sheet of plain unsoftened regenerated cellulose sheeting is immersed in a bath of the following composition:

| | Parts by weight |
|---|---|
| Water | 95.0 |
| Formaldehyde | 5.0 |

The sheet is drained and dried in the usual manner.

Example V

The following bath composition may be substituted in Example IV if desired:

| | Parts by weight |
|---|---|
| Water | 90.0 |
| Dimethylolurea | 10.0 |

It is not essential that an aqueous treating bath be employed and in many instances the use of a solvent other than water is desirable or required depending on the base or the mold inhibitive agent. Thus the base sheet may be treated as follows:

Example VI

A sheet of plain regenerated cellulose sheeting, softened or not as desired, may be treated with a bath of the following composition:

| | Parts by weight |
|---|---|
| Alcohol | 95.0 |
| Thioformaldehyde | 5.0 |

The sheet is then drained and dried as usual.

It is sometimes desirable to give the sheet a preliminary washing in the solvent employed in order to insure complete even impregnation of the treating bath.

Example VII

For the bath composition of Example VI the following may be substituted:

| | Parts by weight |
|---|---|
| Alcohol | 95.0 |
| Di(diethylaminomethoxymethyl)urea | 5.0 |

The invention is particularly adapted to the manufacture of cellulosic pellicles of the type described by a continuous process. Thus, for example, in the manufacture of regenerated cellulose pellicles as by the viscose process, the viscose is extruded into a suitable coagulating and/or regenerating bath from which the cellulosic pellicle is led in continuous manner through purifying, bleaching and washing baths and then through a softening bath just before passing to a drier apparatus, from which latter the pellicle is withdrawn in continuous fashion and conveniently wound in rolls suitable for further finishing operations, such as cutting, slitting, coating or the like. The instant invention may be practiced by adding the proper agents in suitable amounts to the softening bath or at least to the last bath prior to entry of the pellicle into the drier. The pellicle is then passed over drier rolls and collected in a well-known manner.

As has been mentioned above, it is not necessary to use aqueous treating baths for applying the mold inhibitive agent. When it is desired to use a non-aqueous treating bath, it is best to submit the pellicle to a series of baths to remove the water and replace it with the solvent of the treating bath. Thus, for example, if an alcohol bath such as is described in Examples VI or VII is used, it will be best to replace the water in the pellicle with alcohol by passing the pellicle through one or more alcohol baths prior to treatment with the mold inhibitive agent. Likewise, if a water immiscible solvent is used for the mold inhibitor bath, the water may be replaced by washing with a water miscible solvent which is also miscible with the solvent of the treating bath whereupon the water miscible solvent can be replaced by the water immiscible solvent.

If it is desirable to practice the invention as a continuous operation separate and distinct from the casting operation, the finished, dry cellulosic pellicle as obtained from the casting machine, may be led through a series of treating baths. It is best in practicing this embodiment of the invention to pass the pellicle through water to swell the cellulosic structure and insure complete subsequent impregnation. If desired the water or swelling agent may be displaced by other solvents in the manner described above.

It is usually most convenient to practice the invention in connection with gel cellulosic pellicles, that is, pellicles which have been cast, purified, bleached and washed but not dried. Economies in practice are thus possible since rewetting, resoftening, redrying, etc., are avoided. The invention, however, is not restricted to the use of gel pellicles.

Depending on the method chosen for treating the pellicles, i. e., continuous or discontinuous, the drying conditions may vary. Except as it may speed up the process there is no need for drying at an elevated temperature. In continuous process, however, a series of heated drier rolls may be used or the pellicle may be festooned in the conventional manner in a drying chamber at temperatures as high as 100° C. without material detriment to the final product as a mold inhibiting wrapping material.

Where transparency of the final product is not essential or where it is desired to combine the present invention with some other treating process, suspensions of the mold inhibitive agents may be used. The following example illustrates the combination of the instant invention with a waxing operation.

*Example VIII*

A sheet of regenerated cellulose, softened or not as desired, is immersed in or sprayed with a solution containing:

| | Parts by weight |
|---|---|
| Toluene | 80.0 |
| Paraffin | 20.0 |
| Formaldehyde | 2.0 |

The sheet is dried, preferably at a temperature above the melting point of the wax to produce a smooth surfaced, transparent or translucent sheet. This example may be practiced, using a base pellicle from which the water has previously been displaced by toluene. The amount of formaldehyde or its equivalent may be varied to suit the requirements and the quantity may influence the completeness of solution and the transparency of the product.

The effectiveness of wrapping materials in providing the mold growth inhibition is shown by the following table:

*Table.—Bread mold*

Slices of fresh bread were inoculated with mold spores and wrapped in regenerated cellulose pellicles treated in accordance with the invention. Controls were run simultaneously using similar regenerated cellulose pellicles which had not been treated to inhibit mold growth.

| Composition | Treated pellicle | Control pellicle |
|---|---|---|
| Ex. I | No mold—14 days | Molded—3 days. |
| Ex. IV | No mold—4 days | Badly molded—4 days. |
| Ex. V | No mold—3 days | Badly molded—3 days. |
| Ex. VIII | Five wrapped pieces—1 piece molded—1 month. | Five wrapped pieces—all badly molded—5 days. |

Oranges, inoculated with mold spores, were wrapped in regenerated cellulose pellicles treated with the composition of Example III. The oranges wrapped in the treated pellicles showed no molding after two months' storage whereas controls in which the wrapping material was untreated regenerated cellulose sheeting had molded after three days' aging under similar conditions. Similarly good results are obtained using the compositions of Examples V, VI, and VII in place of Example III above.

The products of the invention are remarkably stable and may be stored for long periods of time between manufacture and use without appreciable loss of effectiveness. Even prolonged heating does not remove the mold inhibitive agent as is evidenced by the fact that a sample prepared in accordance with Example I, for instance, after seven weeks storage at ordinary temperatures, followed by 25 minutes heating at 100° C. in an air oven, still showed a strongly positive test for formaldehyde. Similarly pellicles treated as in Example II, dried in air overnight and heated for 25 minutes at 100° C. in an air oven, gave a test for formaldehyde substantially as strong as a test prior to heating.

The products also show no tendency to develop any appreciable odor even on long storage. Thus, samples preserved in a closely packed condition gave no detectable odor after having been left undisturbed for seven weeks.

The invention has been described with particular regard to transparent colorless pellicles but it is within the scope of the invention to treat colored, opaque, pigmented, printed or other pellicles where these qualities are desired. Preferably, the coloring, pigmenting or the like may be done prior to the mold inhibitive treatment, although in printing, for example, the mold inhibitive treatment may be carried out advantageously prior to the printing operation. Similarly the treatment of the instant invention in no way interferes with any subsequent treatments which may be given the pellicle such as coating, sizing or the like. Obviously a superficial coating will decrease the effectiveness of the pellicle as a mold inhibitive wrapper but will not interfere with the protection against mold growth within the wrapper itself or the effectiveness of the wrapper in preventing contamination of other adjacent packages.

Many changes and modifications of the invention as above described may obviously be made without departing from the nature and spirit of the invention. It is therefore to be understood that the invention is not to be limited thereto except as set forth in the appended claims.

We claim:

1. The method of packaging commodities which comprises treating a regenerated cellulose pellicle with a solution of a mold inhibitive agent of the class consisting of formaldehyde and thioformaldehyde, drying the same, and applying the pellicle to the wrapping of a commodity which is susceptible to mold growth, said mold inhibitive agent being present in the pellicle in a concentration so small as not to impart taste or odor to the commodity, but sufficient to prevent mold growth.

2. The method of packaging commodities which comprises treating a regenerated cellulose pellicle with a 0.5–20% aqueous solution of a mold inhibitive agent of the class consisting of formaldehyde and thioformaldehyde to incorporate therein an amount of the said agent such that upon drying the pellicle there is a quantity sufficient to prevent mold growth but insufficient to impart taste or odor to a commodity wrapped therein, drying the same and applying the pellicle to the wrapping of commodities which are susceptible to mold growth.

3. The method of packaging commodities which comprises treating a regenerated cellulose pellicle with a solution of a mold inhibitive agent of the class consisting of formaldehyde and thioformaldehyde, drying the same at an elevated temperature, and applying the pellicle to the wrapping of commodities which are susceptible to mold growth, said mold inhibitive agent being present in the pellicle in a concentration so small as not to impart taste or odor to the commodity, but sufficient to prevent mold growth.

4. The method of packaging commodities which comprises treating a regenerated cellulose pellicle with a solution of formaldehyde, drying the same and applying the pellicle to the wrapping of a commodity which is susceptible to mold growth, the formaldehyde being present in the pellicle in a concentration so small as not to impart taste or odor to the commodity but sufficient to prevent mold growth.

5. The method of packaging commodities which comprises treating a regenerated cellulose pellicle with a solution of thioformaldehyde, drying the same and applying the pellicle to the wrapping of a commodity which is susceptible to mold growth, the thioformaldehyde being present in the pellicle in a concentration so small as not to impart taste or odor to the commodity but sufficient to prevent mold growth.

GEORGE H. LATHAM.
JAMES K. HUNT.